United States Patent Office 2,872,476
Patented Feb. 3, 1959

2,872,476

NEW META - DIALKYLAMINOETHOXYBENZOIC ACID ESTERS, THEIR HYDROCHLORIDES, AND PROCESS FOR THEIR PREPARATION

Diran Melkonian and Philippe Gold, Geneva, Switzerland, assignors, by mesne assignments, to Zyma S. A., Nyon, Switzerland No Drawing. Application May 21, 1956
Serial No. 585,949

Claims priority, application Switzerland May 25, 1955

4 Claims. (Cl. 260—471)

This invention is concerned with the preparation of novel compounds having local anaesthetic action.

Local anesthetics are known which are ortho and para derivatives of benzoic acid, the para derivatives being generally more active than the ortho ones. These known derivatives either present an amino group directly linked to the nucleus, or their acid function is esterified by organic radical containing an amino group. On the other hand there are not known, among these anesthetics, derivatives of benzoic acid esterified by an un-aminated aliphatic alcohol and presenting in the meta position a hydroxy group etherified by an aminated alcohol.

Accordingly the invention therefore provides as novel chemical compounds, having useful local anaesthetic action, meta-dialkylaminoethoxybenzoic acid esters represented by the general formula

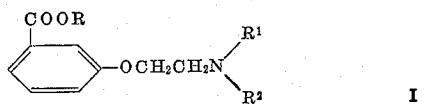

wherein R, R¹ and R² are selected from the group consisting of methyl, ethyl and propyl radicals and their non-toxic salts.

The term "non-toxic" as applied to salts of the new compounds is intended to designate such salts the anion of which is not in itself substantially toxic, in the dosages used.

The new compounds of the above Formula I can be prepared in any desired way. In general terms one may for example react a compound of formula

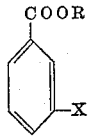

with a compound of formula

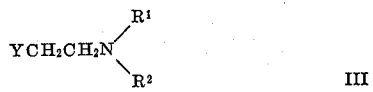

in which X and Y are two groups which react together to form an ether link between the residue to which they are attached. X and Y will be different and examples of groups which they may represent are —OH, —ONa or halogen. For example if —X is —OH, Y may be halogen, such as chlorine.

Such reactions are preferably carried out in alkaline media, particularly in the presence of an alkali alcoholate but bases and basic salts may also be used.

Among the esters which can be prepared by the process according to the invention, ethyl meta-diethylamino-ethoxybenzoate and its non-toxic salts particularly the hydrochloride, are specially interesting in view of their properties. This ester has in fact an anaesthetic power, by contact, superior to that of diethylamino-2,6-dimethyl-acetanalide (lignocaine) and that of cocaine, but inferior to that of diethylenediamine α-butyloxycinchoninate hydrochloride (cinchocaine). Its anaesthetic power by injection is superior to that of p-amino-benzoyl-diethyl-amino ethanol hydrochloride (procaine) and of diethyl-amino-2,6-dimethyl-acetanilide, unmixed with adrenalin, but inferior to that of cinchocaine (without adrenalin) and of lignocaine mixed with adrenalin. Its anaesthetic power is potentialized by adrenalin, as is the case for standard anaesthetics. This novel ester also makes it possible to prepare an efficaceous anaesthetic without adrenalin, which is interesting in cases where there exists a hypersensitivity of the neurovegetative system to adrenalin (tachydardia, extra systoles, syncope).

In order that the invention may be well understood the following examples are given only as illustrations:

Example 1

0.46 g. of metallic sodium are dissolved in 20 ccs. of absolute ethyl alcohol, and 3.32 g. of ethyl-m-hydroxy-benzoate are separately dissolved in the same quantity of absolute ethyl alcohol. The two solutions obtained are mixed in the cold. 2.71 g. of freshly distilled chlorethyl-diethylamine are added to the mixture. After a few moments, the solution clouds and becomes milky. The mixture is then heated over a water bath for several hours. It is then allowed to cool, and the sodium chloride formed filtered off. The filtrate is evaporated under reduced pressure leaving a residue in the form of a pale yellow oil. The latter is washed with water, extracted with ether and the ethereal solution dried. After elimination of the ether, ethylmetadiethylaminoethoxybenzoate is obtained which is transformed into its hydrochloride. The latter is a white powder, soluble in water and in alcohol and insoluble in ether; its melting point is from 121 to 122° C., according to the method of the Pharmacopoeia Helvetica, and from 122 to 123° C. with the "Culatti" electrical apparatus.

The above reaction can be written as follows:

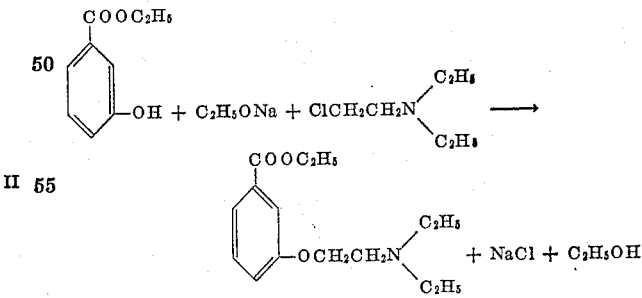

Example 2

0.92 g. of metallic sodium is dissolved in 40 ccs. of absolute ethyl alcohol, and 3.32 g. of ethyl-meta-hydroxy-benzoate is separately dissolved in a further 40 ccs. of absolute ethyl alcohol. 3.44 g. of dry chlorethyl diethyl-amino hydrochloride is added to this second solution. After dissolution the two solutions are mixed; a milky cloudiness results. The mixture is heated on a water bath for several hours. After cooling the sodium chloride formed is filtered off. One proceeds then as in Example 1.

The reaction of this second example can be written as follows:

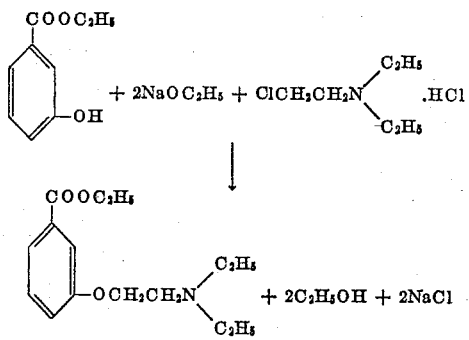

What we claim is:
1. As new compounds, compounds of the general formula

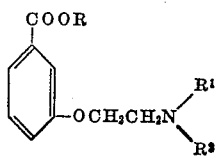

wherein R, $R^1$ and $R^2$ are selected from the group consisting of methyl, ethyl and propyl radicals and their non-toxic salts.

2. The hydrochlorides of the compounds claimed in claim 1.

3. Meta-diethylaminoethoxybenzoic acid ethyl ester and its non-toxic salts.

4. Meta-diethylaminoethoxybenzoic acid ethyl ester hydrochloride.

References Cited in the file of this patent

FOREIGN PATENTS 135,348    Switzerland _____ Nov. 16, 1929

OTHER REFERENCES

Einhorn et al.: Chem. Abst., 5, 3459–60 (1911).
Koch: Chem. Abst., 32, 5807 (1938).